(12) United States Patent
Umezawa et al.

(10) Patent No.: US 11,421,733 B2
(45) Date of Patent: Aug. 23, 2022

(54) BEARING ASSEMBLY AND METHOD FOR MANUFACTURING SAME, AND METHOD FOR MANUFACTURING PROPELLER SHAFT

(71) Applicant: Hitachi Astemo, Ltd., Ibaraki (JP)

(72) Inventors: Shou Umezawa, Ibaraki (JP); Daejin Shin, Ibaraki (JP)

(73) Assignee: Hitachi Astemo, Ltd., Ibaraki (JP)

( * ) Notice: Subject to any disclaimer, the term of this patent is extended or adjusted under 35 U.S.C. 154(b) by 0 days.

(21) Appl. No.: 17/183,320

(22) Filed: Feb. 23, 2021

(65) Prior Publication Data

US 2021/0180649 A1    Jun. 17, 2021

Related U.S. Application Data

(63) Continuation of application No. PCT/JP2018/047443, filed on Dec. 25, 2018.

(30) Foreign Application Priority Data

Dec. 10, 2018   (JP) .............................. JP2018-230494

(51) Int. Cl.
    *F16C 27/06*    (2006.01)
    *F16C 19/52*    (2006.01)
    *F16C 19/06*    (2006.01)

(52) U.S. Cl.
    CPC .......... *F16C 27/066* (2013.01); *F16C 19/527* (2013.01); *F16C 19/06* (2013.01); *F16C 2326/06* (2013.01)

(58) Field of Classification Search
    CPC ...... F16C 19/06; F16C 19/527; F16C 27/066; F16C 35/077; F16C 2326/06;
    (Continued)

(56) References Cited

U.S. PATENT DOCUMENTS 2,906,572 A * 9/1959 Wrobyjohn ........... F16C 27/066
                                                384/536
3,639,015 A * 2/1972 Maas .................... F16C 27/066
                                                384/536
(Continued)

FOREIGN PATENT DOCUMENTS

DE      19748728 A1 * 5/1999 .......... F16C 33/6603
GB       2359121 A  * 8/2001 ............ F16C 27/066
(Continued)

OTHER PUBLICATIONS

International Search Report and Written Opinion of the International Search Report for PCT/JP2018/047443 dated Mar. 26, 2019.
(Continued)

*Primary Examiner* — Alan B Waits
(74) *Attorney, Agent, or Firm* — Kenealy Vaidya LLP (57) ABSTRACT

A bearing assembly includes: a bearing; a pair of first vibration absorbing members each including a flexible part, an inner ring, and an outer ring, wherein the inner rings are fitted over the bearing in opposite directions along an axis; an annular second vibration absorbing member sandwiched between the pair of first vibration absorbing members in a direction along the axis to be disposed on a radially outer side of the inner rings, the annular second vibration absorbing member having a plurality of inner pin holes penetrating from an outer circumference of the annular second vibration absorbing member to an inner circumference thereof; and an annular holding member fitted over the outer rings and having a plurality of outer pin holes penetrating from an outer circumference of the annular holding member to an inner circumference thereof so as to respectively align with the inner pin holes.

12 Claims, 8 Drawing Sheets

(58) Field of Classification Search
CPC ........ B60K 17/24; F16F 15/08; F16F 1/3732; F16F 1/38; Y10T 29/49826
USPC ................................ 384/202, 535–537, 488
See application file for complete search history.

(56) References Cited

U.S. PATENT DOCUMENTS

| | | | | |
|---|---|---|---|---|
| 4,392,694 | A * | 7/1983 | Reynolds | F16C 27/066 384/536 |
| 4,722,618 | A * | 2/1988 | Matsumoto | F16C 27/066 384/535 |
| 4,732,230 | A * | 3/1988 | Sakata | B60K 17/24 180/381 |
| 5,161,903 | A * | 11/1992 | March | B60K 17/24 384/478 |
| 6,276,837 | B1 * | 8/2001 | Iwano | F16C 27/066 384/488 |
| 6,869,225 | B2 * | 3/2005 | Tatsumura | F16C 27/066 384/536 |
| 7,044,646 | B1 * | 5/2006 | Aiken | F16C 27/066 384/536 |
| 8,888,376 | B2 * | 11/2014 | Hatogai | F16F 1/38 384/536 |
| 8,961,024 | B2 * | 2/2015 | Ikeda | F16C 27/066 384/536 |
| 9,328,772 | B2 * | 5/2016 | Ikeda | F16C 35/04 |
| 2006/0147144 | A1 * | 7/2006 | Holman | F16C 27/066 384/536 |
| 2008/0095484 | A1 * | 4/2008 | Wirges | F16C 27/066 384/536 |
| 2011/0114815 | A1 * | 5/2011 | Valovick | F16F 1/3732 248/560 |
| 2013/0287330 | A1 * | 10/2013 | Ikeda | B60K 17/24 384/536 |

FOREIGN PATENT DOCUMENTS

| | | |
|---|---|---|
| JP | S61-120621 U | 7/1986 |
| JP | H01-038338 Y2 | 11/1989 |
| JP | H04-034241 A | 2/1992 |
| JP | H05-001019 U | 1/1993 |
| JP | H06-078619 U | 11/1994 |
| JP | H08-175205 A | 7/1996 |
| JP | 2006-062623 A | 3/2006 |
| WO | 2020/121537 A1 | 6/2020 |

OTHER PUBLICATIONS

Japanese Office Action (Decision to Refusal) for the related Japanese Patent Application No. 2018-230494 dated Mar. 18, 2019.

* cited by examiner

BEARING ASSEMBLY AND METHOD FOR MANUFACTURING SAME, AND METHOD FOR MANUFACTURING PROPELLER SHAFT

CROSS-REFERENCE TO RELATED APPLICATIONS

This application is a continuation application of PCT/JP2018/047443, filed on Dec. 25, 2018, which claims priority to Japanese Patent Application No. 2018-230494, filed on Dec. 10, 2018, the contents of which are hereby incorporated by reference in their entireties.

BACKGROUND

1. Technical Field

The present invention relates to a bearing assembly, a method for manufacturing the same, and a method for manufacturing a propeller shaft.

2. Description of Related Art

The propeller shafts of an automobile transmit the power generated by the prime mover in a forward part of the vehicle and decelerated by a transmission to the final deceleration device mounted in a rearward part of the vehicle. The propeller shafts are provided with two or more universal joints between which steel pipes are arranged. The propeller shafts are attached to the vehicle using intermediate bearing units and an additional universal joint(s) is/are added as needed. Each intermediate bearing unit generally includes a bearing in which the shaft member of a propeller shaft is internally fitted, a vibration absorbing member (referred to as a first vibration absorbing member) in which the bearing is internally fitted, and a bracket in which the first vibration absorbing member is internally fitted and which is attached to the vehicle body floor.

A known first vibration absorbing member includes: a rubber flexible part that has portions formed back to back and being convex in axial directions; an inner ring which is integrally molded with the inner circumference of the rubber flexible part and in which a bearing is internally fitted; and an outer ring which is integrally molded with the outer circumference of the rubber flexible part and which is fitted in a bracket. When a sudden force couple in a radial direction acts on the flexible part as in the starting of the vehicle, if the deformation of the flexible part becomes large and a bottom thrust occurs, an unpleasant vibration may occur. In view of this problem, Japanese Patent Laid-Open No. H08-175205 describes a configuration in which another vibration absorbing member (referred to as a second vibration absorbing member) is arranged as a stopper inside the flexible part of the first vibration absorbing member.

When the assembly of propeller shafts is completed, the balance of every propeller shaft is corrected. At that time, it is necessary to firmly hold an outer diameter portion of the bearing of each intermediate bearing unit. For this reason, it is necessary to hold the outer diameter portion side of the bearing with a holding pin, and the first vibration absorbing member is formed with an insertion through hole extending in a radial direction for passing the holding pin (see, for example, Japanese Utility Model Laid-Open No. H06-78619).

Moreover, Japanese Utility Model Publication No. H01-38338 describes a technique relating to a bracket of an intermediate bearing unit.

SUMMARY

Problems to be Solved by the Invention

For example, according to Japanese Utility Model Laid-Open No. H06-78619, the second vibration absorbing member is attached after a step of adjusting the balance of the propeller shaft. The second vibration absorbing member, which extends in a band shape, is caused to be elastically deformed in an annular shape and wound around an inner diameter portion of the first vibration absorbing member. Then, in order to maintain the annular state, it is necessary to fix the second vibration absorbing member, for example, by forming unevenness or the like on the second vibration absorbing member, and there is a problem that the manual assembly work tends to be complicated.

Further, as it is difficult to press-fit the first vibration absorbing member into the bracket, the bracket is constituted by two parts, i.e., upper and lower brackets, as described in Japanese Utility Model Publication No. H01-38338, and the first vibration absorbing member is sandwiched between the upper and lower brackets. However, according to this technique, it is necessary to hold the upper and lower brackets so that they do not separate during the time from when the propeller shaft is completed to when it is attached to the vehicle. In this regard, Japanese Utility Model Publication No. H01-38338 describes a technique of temporarily fixing with a clip. However, the method using a clip tends to complicate the assembly work.

The present invention has been made to solve the above problems, and it is an object of the present invention to provide a bearing assembly, a method for manufacturing the bearing assembly, and a method for manufacturing a propeller shaft, which enhance the degree of freedom in design to improve productivity and the vibration damping performance.

Solution to Problems

To solve the above-described problems, a first aspect of the present invention is a bearing assembly including: a bearing; a pair of first vibration absorbing members each including an annular flexible part, an inner ring arranged on an inner circumferential side of the annular flexible part, and an outer ring arranged on an outer circumferential side of the annular flexible part, wherein the inner rings of the pair of first vibration absorbing members are fitted over the bearing in opposite axial directions; a second vibration absorbing member having an annular shape and sandwiched between the pair of first vibration absorbing members in an axial direction to be disposed on a radially outer side of the inner rings, the second vibration absorbing member having a plurality of inner pin holes penetrating from an outer circumference of the second vibration absorbing member to an inner circumference thereof; and an annular holding member fitted over the outer rings and having a plurality of outer pin holes penetrating from an outer circumference of the annular holding member to an inner circumference thereof so as to respectively align with the inner pin holes.

According to the first aspect of the present invention, the following effects are achieved.

(1) The bearing assembly has a simple structure in which the annular second vibration absorbing member is sandwiched between the pair of first vibration absorbing members. This structure leads to an increased efficiency of the assembly work.

(2) As the annular holding member is provided, there is no need of performing such a conventional assembly operation as to temporarily fix a two-part holding member with a clip. Therefore, the efficiency of assembling the bearing assembly is increased.

(3) Providing the inner pin holes and the outer pin holes respectively in the second vibration absorbing member and the annular holding member makes it possible to correct the balance of the shaft member fitted in the bearing, in a state in which the completed bearing assembly has been incorporated. Therefore, the efficiency of incorporating the shaft member is increased.

(4) As the second vibration absorbing member is molded in an annular shape in advance, the degree of freedom in selecting the shape and material of the second vibration absorbing member is large compared to that of the conventional structure in which the second vibration absorbing member is made to be elastically deformed from a band state when being incorporated. This leads to an increase in the degree of freedom in designing the vibration damping characteristics of the second vibration absorbing member.

The second vibration absorbing member is preferably made of a rubber material.

The second vibration absorbing member may have an annular projected portion formed along an entire circumference of the second vibration absorbing member, which annular projected portion is inclined toward a radially outward direction and has a thickness that gradually decreases in the radially outward direction. In this case, when an excessive displacement occurs in the flexible part in the radial direction and the outer circumferential side of the flexible part comes into contact with the annular projected portion, the annular projected portion gets deformed in a flexible manner in a radially inward direction, causing the spring constant to vary gently to reduce the vibration.

The second vibration absorbing member may have an end surface in which a plurality of recesses are formed to be arranged in a circumferential direction of the second vibration absorbing member. Also in this case, the outer circumferential surface of the second vibration absorbing member gets deformed in a flexible manner due to the presence of the recesses, causing the spring constant to vary gently to reduce the vibration.

Moreover, the second vibration absorbing member may be made of a foam material.

The outer ring of the first vibration absorbing member may be configured to be press-fitted into the annular holding member. This configuration further increases the efficiency of the assembly work.

A second aspect of the present invention is a method for manufacturing a bearing assembly including: a bearing; a pair of first vibration absorbing members each including an annular flexible part, an inner ring arranged on an inner circumferential side of the annular flexible part, and an outer ring arranged on an outer circumferential side of the annular flexible part, wherein the inner rings of the pair of first vibration absorbing members are fitted over the bearing in opposite axial directions; and an annular holding member fitted over the outer rings and having a plurality of pin holes penetrating from an outer circumference of the annular holding member to an inner circumference thereof. The method includes: filling a space between the pair of first vibration absorbing members with a second vibration absorbing member through the pin holes.

According to the second aspect of the present invention, the following effects are achieved.

(1) The bearing assembly can be manufactured by a simple method of filling the space between the pair of first vibration absorbing members with the second vibration absorbing member.

(2) As the annular holding member is provided, there is no need of performing such a conventional assembly operation as to temporarily fix a two-part holding member with a clip. Therefore, the efficiency of assembling the bearing assembly is increased.

A third aspect of the present invention is a method for manufacturing a propeller shaft held by a bearing assembly including: a bearing; a pair of first vibration absorbing members each including an annular flexible part, an inner ring arranged on an inner circumferential side of the annular flexible part, and an outer ring arranged on an outer circumferential side of the annular flexible part, wherein the inner rings of the pair of first vibration absorbing members are fitted over the bearing in opposite axial directions; and an annular holding member fitted over the outer rings and having a plurality of pin holes penetrating from an outer circumference of the annular holding member to an inner circumference thereof. The method includes: inserting nozzles into a space between the pair of first vibration absorbing members through the pin holes; filling the space between the pair of first vibration absorbing members with a second vibration absorbing member through the nozzles; and inserting holding pins for holding the inner rings into nozzle removal holes formed by the nozzles being pulled out after the filling; and correcting a balance of the propeller shaft.

According to the third aspect of the present invention, the following effects are achieved.

(1) The bearing assembly can be manufactured by a simple method of filling the space between the pair of first vibration absorbing members with the second vibration absorbing member.

(2) As the annular holding member is provided, there is no need of performing such a conventional assembly operation as to temporarily fix a two-part holding member with a clip. Therefore, the efficiency of assembling the bearing assembly is increased.

(3) It is possible to correct the balance of the propeller shaft in a state in which the completed bearing assembly has been incorporated. Therefore, the efficiency of incorporating the propeller shaft is increased.

Effects of the Invention

According to the present invention, it is possible to increase the productivity of the bearing assembly and increase the degree of freedom in design for improving the vibration damping performance.

DETAILED DESCRIPTION OF EMBODIMENTS

First Embodiment

Figure 1:
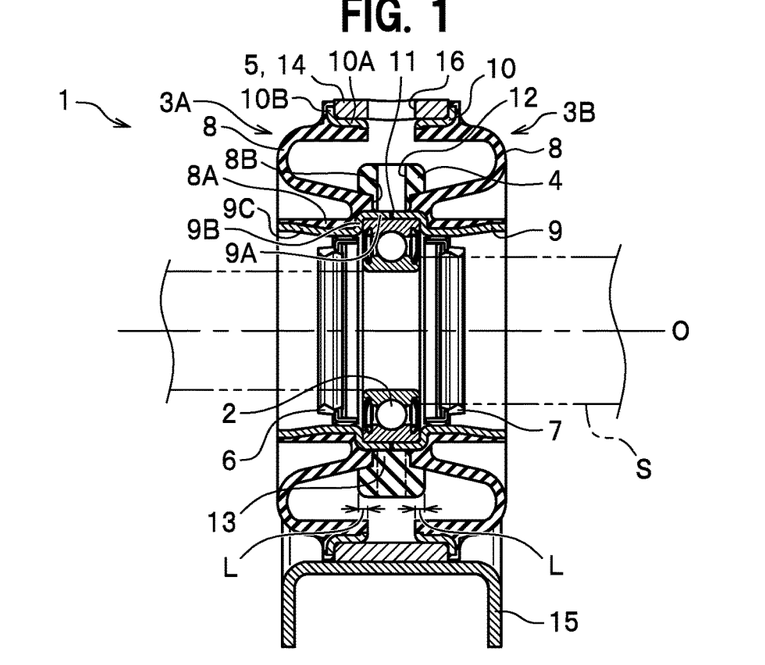
FIG. 1 is a side sectional view of a bearing assembly of a first embodiment.

The first embodiment will be described with reference to FIGS. 1 to 5. In FIG. 1, the bearing assembly 1 includes a bearing 2, a pair of first vibration absorbing members 3A and 3B, a second vibration absorbing member 4, and a holding member 5.

For example, a stub shaft S forming a part of a propeller shaft of an automobile is fitted in the bearing 2. The stub shaft S is, for example, a solid shaft member, one end of which is connected to a power transmission member of a not-shown constant velocity joint and the other end of which is connected to a hollow shaft member, e.g. a steel pipe. Provided on one axis-O direction end side and the other axis-O direction end side of the bearing 2 are seal members 6 and 7 for preventing muddy water, dust, etc. from entering the bearing 2.

The first vibration absorbing members 3A and 3B each have an annular flexible part 8, an inner ring 9 disposed on the inner circumferential side of the flexible part 8, and an outer ring 10 disposed on the outer circumferential side of the flexible part 8. The flexible part 8 of the first vibration absorbing member 3A is formed in a substantially U shape to project toward one end in a direction along the axis O. The flexible part 8 is made of a rubber material. The first vibration absorbing member 3A attenuates the vibration from the stub shaft S by the flexible part 8 being elastically deformed, thereby reducing the transmission of the vibration to the vehicle body.

An inner ring joint portion 8A is formed on the inner circumferential side of the flexible part 8. The inner ring 9 is vulcanized and bonded to the inner circumference of the inner ring joint portion 8A. The inner ring 9 includes: an outer fitting cylindrical portion 9A that is press-fitted over one end portion of the outer ring of the bearing 2; a flange portion 9B that extends radially inward from one end of the outer fitting cylindrical portion 9A and abuts on an end surface of the outer ring of the bearing 2; and a cover cylindrical portion 9C extending from an inner end of the flange portion 9B toward one end in the direction along the axis O to the same extent as a tip position of the flexible part 8.

Regarding the outer circumference of the outer fitting cylindrical portion 9A, one end portion is vulcanized and bonded to the other end portion of the inner ring joint portion 8A. The other end portion of the outer circumference of the outer fitting cylindrical portion 9A is exposed without being vulcanized and bonded to the inner ring joint portion 8A because holding pins 17 are to be pressed against the other end portion of the outer circumference of the outer fitting cylindrical portion 9A during the balance correction work described later. At the other end of the inner ring joint portion 8A, a stepped end face 8B is formed perpendicularly to the axis O. The inner ring 9 is made of a metal material.

The outer ring 10 is vulcanized and bonded to the outer circumference of the flexible part 8. The outer ring 10 includes: an inner fitting cylindrical portion 10A press-fitted into one end portion of the below-described annular holding member 14; and a flange portion 10B that extends radially outward from one end of the inner fitting cylindrical portion 10A and abuts on an end surface of the annular holding member 14. The outer ring 10 is also made of a metal material.

The first vibration absorbing member 3B is a member having the same shape as the first vibration absorbing member 3A and is arranged such that the orientation of the first vibration absorbing member 3B with respect to a direction along the axis O is opposite to the orientation of the first vibration absorbing member 3A with respect to the direction along the axis O. The outer fitting cylindrical portion 9A of the inner ring 9 is fitted over the other end portion of the outer ring of the bearing 2. The inner fitting cylindrical portion 10A of the outer ring 10 is fitted in the other end portion of the annular holding member 14. Thus, the inner rings 9 of the first vibration absorbing members 3A and 3B are fitted over the bearing 2 respectively in opposite directions along the axis O, and the flexible parts 8 are disposed so that their U-shaped spaces face and communicate with each other. As a result, a rectangular groove 11 is formed between the stepped end faces 8B of the first vibration absorbing members 3A and 3B.

The second vibration absorbing member 4 is a member sandwiched between the pair of first vibration absorbing members 3A and 3B in the direction along the axis O to be disposed radially outwardly of the inner rings 9 and having a plurality of inner pin holes 12 penetrating from the outer circumference of the second vibration absorbing member 4 to the inner circumference thereof. In this embodiment, three inner pin holes 12 are formed. Each of the inner pin holes 12 may be along a radial direction of the axis O or may be inclined with respect to the radial direction. Further, the shape of each hole may be circular or square. The second vibration absorbing member 4 has been molded in an endless annular shape, and the material of the second vibration absorbing member 4 may be a rubber material, e.g., an ethylene propylene rubber, or may be a foam material or the like.

When an excessive displacement occurs in the flexible parts 8 in a radial direction and rigid portions of each flexible part 8 come into contact with each other, i.e., when a so-called bottom thrust occurs, a sharp increase in the spring constant can cause a vibration of the propeller shaft to be directly transmitted to the vehicle body as an unpleasant vibration. The second vibration absorbing member 4 is a stopper provided to prevent this. The second vibration absorbing member 4 comes into contact with the flexible parts 8 before the rigid portions of each flexible part 8 come into contact with each other, thereby to cause the spring constant to vary gently and to reduce the vibration.

The second vibration absorbing member 4 has a substantially rectangular cross section and has, on an inner peripheral side, a fitting portion 13 formed thereon whose width dimension extending in a direction along the axis O is approximately the same as the width of the groove 11. The second vibration absorbing member 4 is disposed so as to overlap with at least one of the first vibration absorbing members 3A and 3B by a length L at the rigid portion (outer ring holding part) thereof to which the outer ring 10 is bonded along a direction along the axis O, thereby to attenuate the vibration in the event of a bottom thrust. The fitting portion 13 of the second vibration absorbing member 4 is fitted into the groove 11. This causes the second vibration absorbing member 4 to be sandwiched between the stepped end faces 8B of the first vibration absorbing members 3A and 3B in the direction along the axis O and thereby attached to the inner circumferences of the flexible parts 8.

Figure 3:
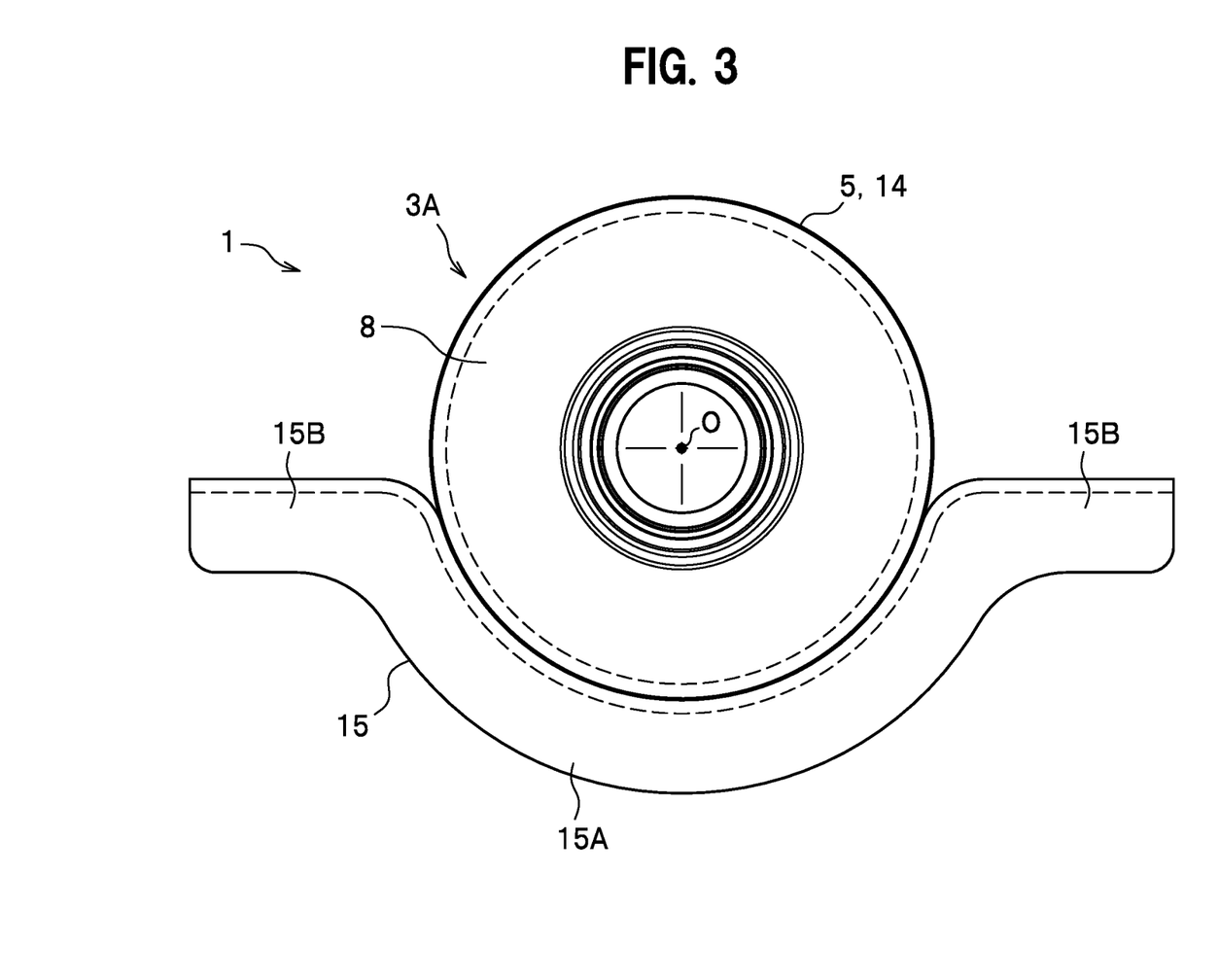
FIG. 3 is a front view of the bearing assembly of the first embodiment.

The holding member 5 includes the annular holding member 14 and a vehicle body mounting member 15. The annular holding member 14 is a short tubular annular member in which the outer rings 10 are fitted. As shown in FIG. 3, the vehicle body mounting member 15 has a semicircular arcuate portion 15A that forms a semicircular arc shape to surround the lower half of the annular holding member 14 when viewed in a direction along the axis O and has a pair of fastening portions 15B one of which extends in the left direction from a left upper end of the semicircular arcuate portion 15A and the other of which extends in the right direction from a right upper end of the semicircular arcuate portion 15A. The vehicle body mounting member 15 is fastened to the vehicle body by bolts (not shown) inserted into bolt holes 15C of the fastening portions 15B.

Figure 4:
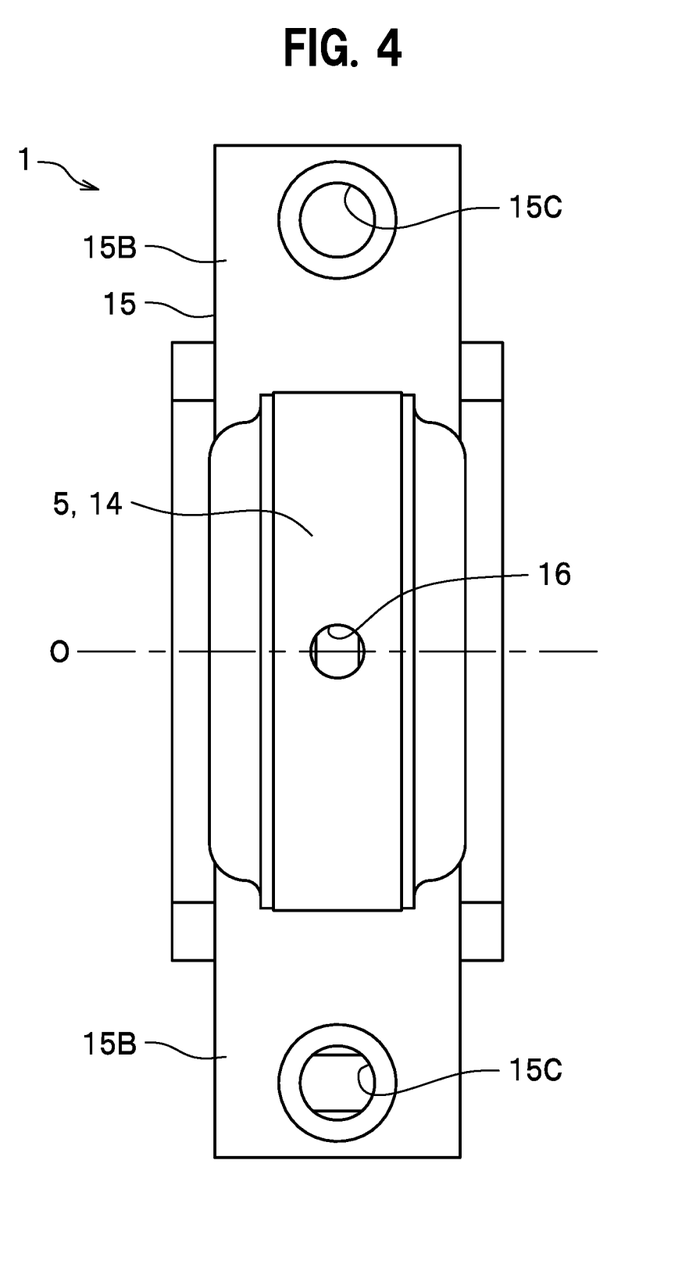
FIG. 4 is a plan view of the bearing assembly of the first embodiment as viewed from above.
Figure 5:
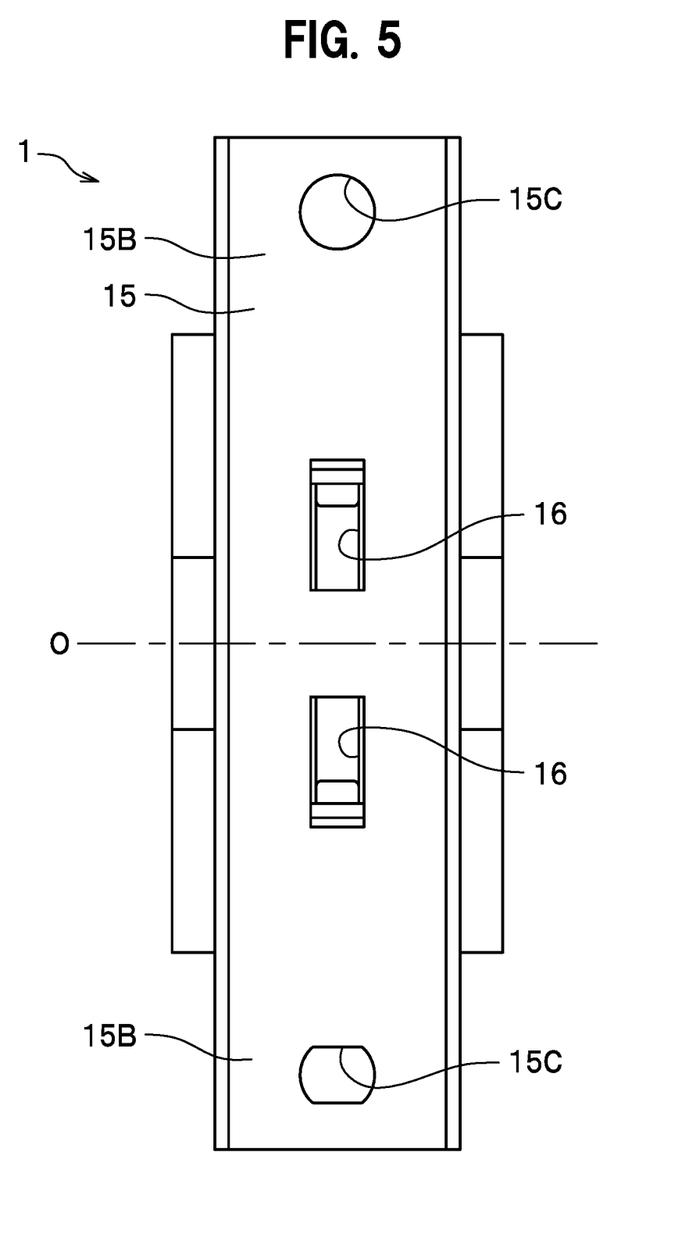
FIG. 5 is a plan view of the bearing assembly of the first embodiment as viewed from below.

The annular holding member 14 has three outer pin holes 16 formed therein penetrating from the outer circumference of the annular holding member 14 to the inner circumference thereof. The three outer pin holes 16 are formed such that each of the three outer pin holes 16 and a corresponding one of the three inner pin holes 12 of the second vibration absorbing member 4 extend in a linear fashion. The shape of the hole may be circular as shown in FIG. 4 or square as shown in FIG. 5.

Figure 2:
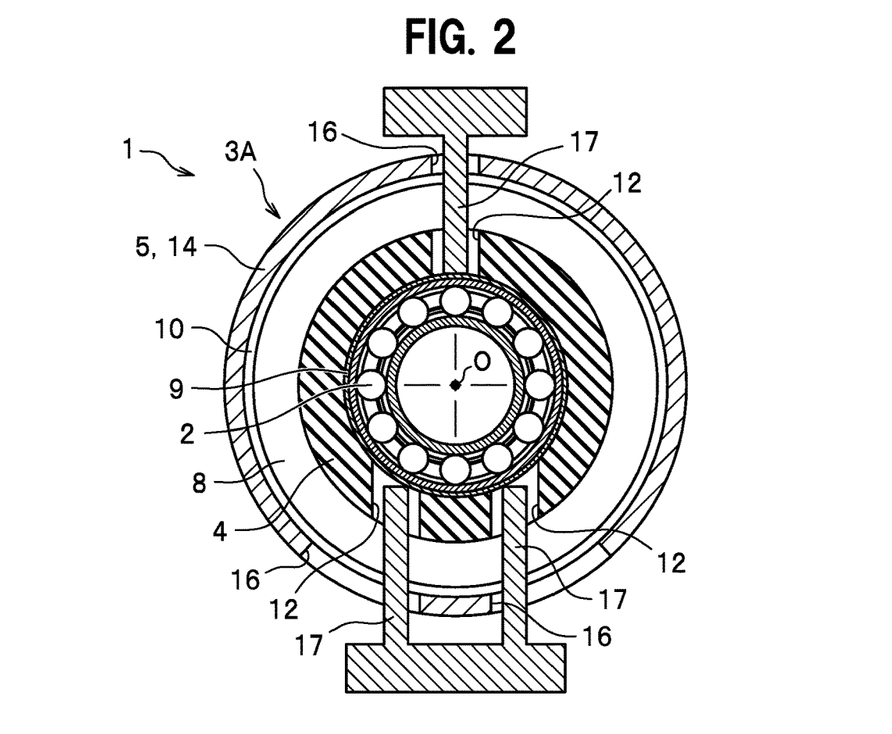
FIG. 2 is a front sectional view of the bearing assembly of the first embodiment.

In the event of correcting the balance of the propeller shaft, as shown in FIG. 2, the holding pins 17 are inserted into the three outer pin holes 16 and the three inner pin holes 12, and the tip of each holding pin 17 is pressed against the inner rings 9 to hold the bearing 2 firmly.

The above-described structure includes: the bearing 2; the pair of first vibration absorbing members 3A, 3B each having the flexible part 8, the inner ring 9, and the outer ring 10, wherein the inner rings 9 are fitted over the bearing 2 in opposite directions along the axis O; the annular second vibration absorbing member 4 disposed radially outwardly of the inner rings 9 by being sandwiched by the pair of the first vibration absorbing members 3A, 3B in a direction along the axis O and having the plurality of inner pin holes 12 penetrating from the outer circumference of the annular second vibration absorbing member 4 to the inner circumference thereof; and the annular holding member 14 fitted over the outer rings 10 and having the plurality of outer pin holes 16 penetrating from the outer circumference of the annular holding member 14 to the inner circumference thereof so as to respectively align with the inner pin holes 12. With this structure, the below-described effects are given.

(1) The bearing assembly 1 has a simple structure in which the annular second vibration absorbing member 4 is sandwiched by the pair of first vibration absorbing members 3A and 3B. This structure leads to an increased efficiency of the assembly work.

(2) As the annular holding member 14 is provided, there is no need of performing such a conventional assembly operation as to temporarily fix a two-part holding member with a clip. Therefore, the efficiency of assembling the bearing assembly 1 is increased.

(3) The inner pin holes 12 provided in the second vibration absorbing member 4 and the outer pin holes 16 provided in the annular holding member 14 make it possible to correct the balance of the propeller shaft, i.e., the stub shaft S fitted in the bearing 2, in a state in which the completed bearing assembly 1 has been incorporated. Therefore, the efficiency of incorporating the propeller shaft is increased.

(4) As the second vibration absorbing member 4 is molded in an annular shape in advance, the degree of freedom in selecting the shape and material of the second vibration absorbing member 4 is large compared to the conventional structure in which a second vibration absorbing member is caused to be elastically deformed from a band state to be incorporated into an assembly. This leads to an improvement in the degree of freedom in designing the vibration damping characteristics of the second vibration absorbing member 4.

Further, as the outer rings 10 of the first vibration absorbing members 3A and 3B are to be press-fitted into the annular holding member 14, the efficiency of assembling the bearing assembly 1 is further increased.

Second Embodiment

Figure 6:
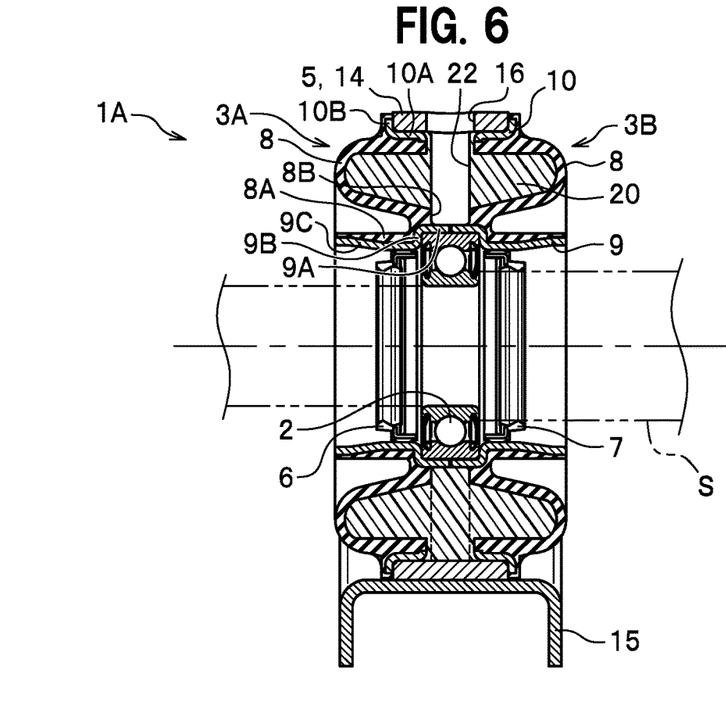
FIG. 6 is a side sectional view of a bearing assembly of a second embodiment.

A second embodiment will be described with reference to FIGS. 6 to 8. The same components as those in the first embodiment are denoted by the same reference signs, and detailed description thereof will be omitted. In FIG. 6, a bearing assembly LA includes the bearing 2, the pair of first vibration absorbing members 3A and 3B, a second vibration absorbing member 20 with which a space between the first vibration absorbing members 3A and 3B has been filled, and the holding member 5. The configurations of the first vibration absorbing members 3A and 3B and the holding member 5 are the same as those in the first embodiment. Hereinafter, a description will be given of a method of filling with the second vibration absorbing member 20.

Figure 7:
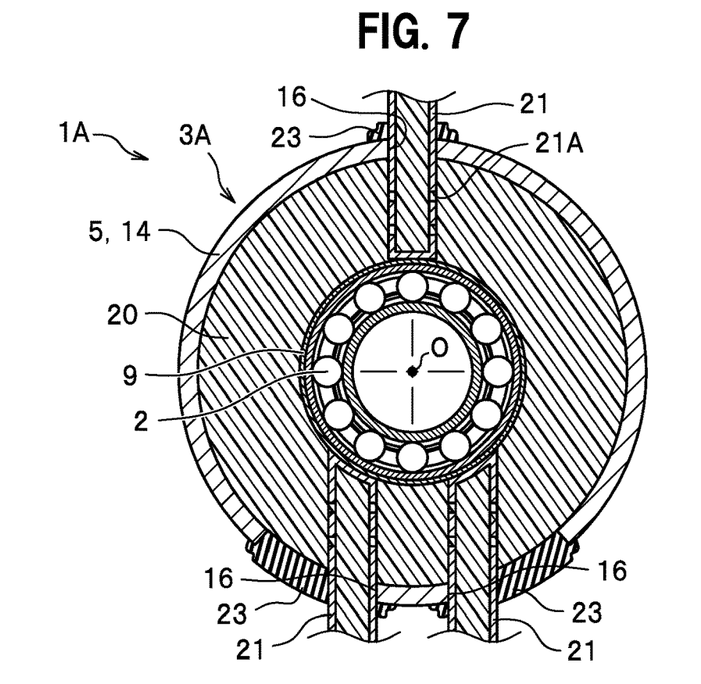
FIG. 7 is a front sectional view of the bearing assembly of the second embodiment, showing a state in which nozzles are inserted into the bearing assembly and the bearing assembly has been filled with a second vibration absorbing member.
Figure 8:
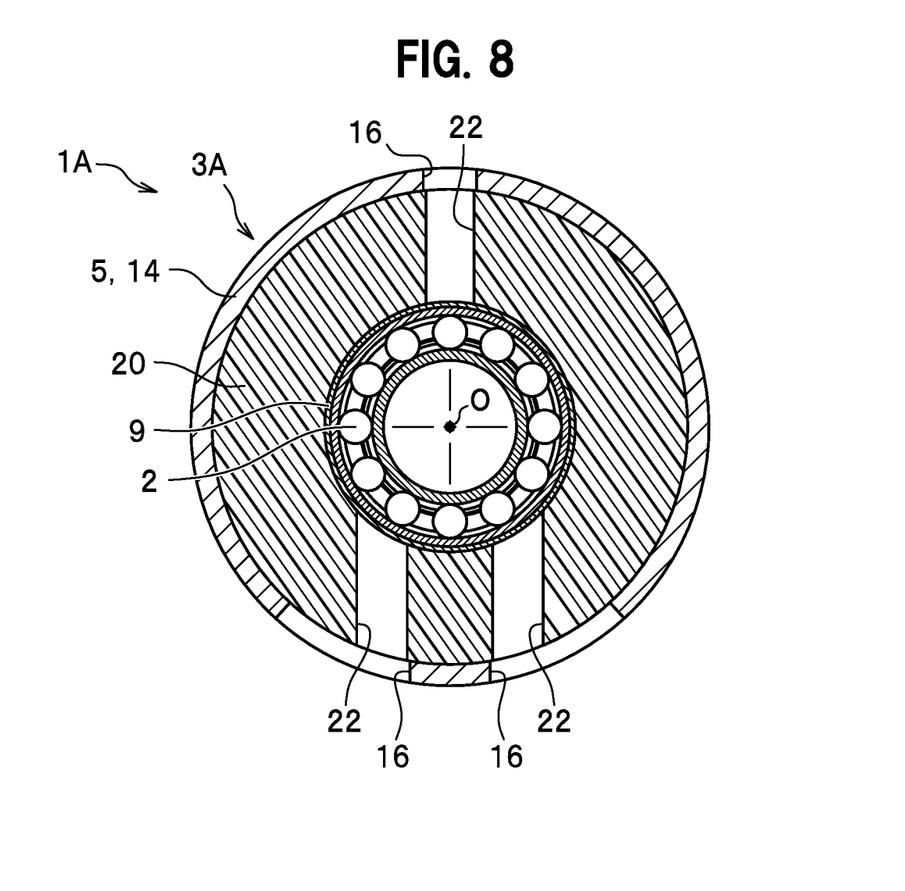
FIG. 8 is a front sectional view of the bearing assembly of the second embodiment, showing a state in which the nozzles have been pulled out after filling with the second vibration absorbing member.

In FIG. 7, three outer pin holes 16 are formed in the annular holding member 14 as in the first embodiment, and tubular nozzles 21 are inserted into the space between the first vibration absorbing members 3A and 3B through the outer pin holes 16. Tip surfaces of the nozzles 21 are each pressed against the outer circumference of the inner rings 9. The nozzles 21 each have a peripheral surface in which a plurality of ejection ports 21A are formed on the distal end side. A sealing material 23 for preventing the second vibration absorbing member 20 from leaking through a gap between each outer pin hole 16 and the corresponding nozzle 21 is attached to the proximal end side of the peripheral surface of the corresponding nozzle 21.

The second vibration absorbing member 20 is ejected through the ejection port 21A of the nozzle 21 to fill the space between the first vibration absorbing members 3A and 3B with the second vibration absorbing member 20. The second vibration absorbing member 20 is made of, for example, a foam material. After the space between the first vibration absorbing members 3A and 3B has been filled with the second vibration absorbing member 20 and the second vibration absorbing member 20 has been solidified, the nozzles 21 are pulled out and, as a result, nozzle removal holes 22 are formed in the second vibration absorbing member 20 as shown in FIG. 8. With this, during the work of correcting the balance of the propeller shaft, the holding pins 17 (FIG. 2) are inserted into the three outer pin holes 16 and the nozzle removal holes 22 in the same manner as in the first embodiment, and the tips of the holding pins 17 are pressed against the inner rings 9 to firmly hold the bearing 2.

The following effects are obtained with the above-described structure including: the bearing 2; the pair of first vibration absorbing members 3A, 3B each having the flexible part 8, the inner ring 9, and the outer ring 10, wherein the inner rings 9 are fitted over the bearing 2 in opposite directions along the axis O; and the annular holding member 14 fitted over the outer rings 10 and having the plurality of outer pin holes 16 penetrating from the outer circumference of the annular holding member 14 to the inner circumference thereof, and with the method of filling the space between the pair of first vibration absorbing members 3A and 3B with second vibration absorbing member 20 through the outer pin holes 16.

(1) The bearing assembly 1A can be manufactured by a simple method of filling the space between the pair of first vibration absorbing members 3A and 3B with the second vibration absorbing member 20.

(2) Since the annular holding member 14 is provided, there is no need of performing such a conventional assembly operation as to temporarily fix a two-part holding member with a clip. Therefore, the efficiency of assembling the bearing assembly 1 is increased.

The method for manufacturing a propeller shaft includes: inserting the nozzles 21 each into the space between the first vibration absorbing members 3A, 3B through a corresponding one of the outer pin holes 16; filling the space between the first vibration absorbing members 3A, 3B with the second vibration absorbing member 20 through the nozzles 21; inserting the holding pins 17 for holding the inner rings 9 into the nozzle removal holes 22, which are formed by the nozzles 21 being pulled out after the filling; and correcting the balance of the propeller shaft. With this method for manufacturing the propeller shaft, it is possible to correct the balance of the propeller shaft in a state in which the completed bearing assembly 1A has been incorporated. Therefore, the efficiency of incorporating the propeller shaft is increased.

Third Embodiment

Figure 9:
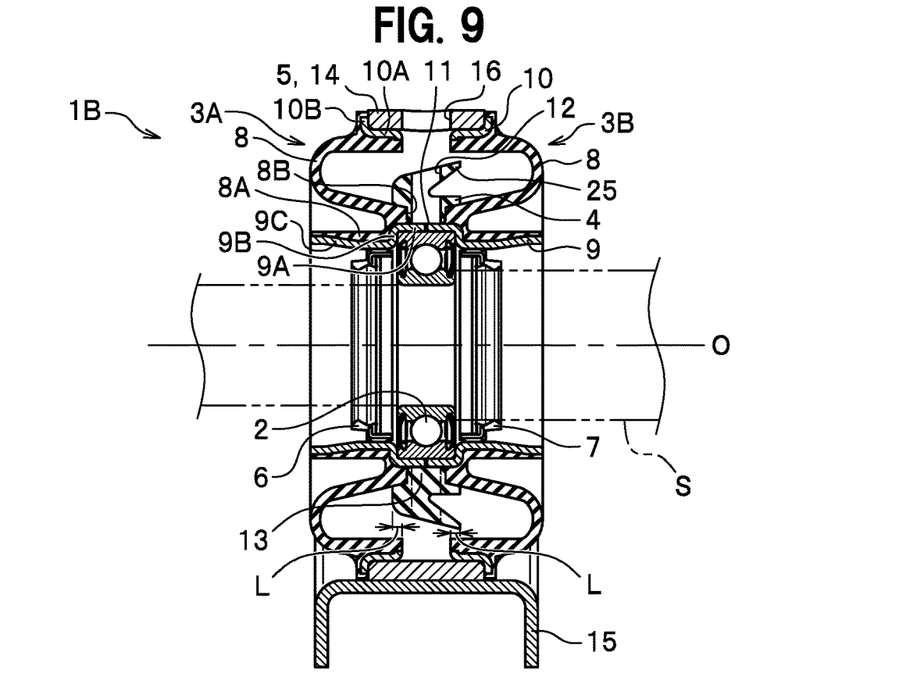
FIG. 9 is a side sectional view of a bearing assembly of a third embodiment.

A third embodiment will be described with reference to FIG. 9. The bearing assembly 1B of the third embodiment differs from the bearing assembly 1 of the first embodiment in that the second vibration absorbing member 4 has an annular projected portion 25 formed thereon. As the other configurations are the same as those in the first embodiment, description thereof will be omitted.

The annular projected portion 25 is formed along the entire circumference of the second vibration absorbing member 4. The annular projected portion 25 is, in a cross section, inclined toward a radially outward direction of the axis O from the outer circumferential surface of the second vibration absorbing member 4 and has a thickness that gradually decreases in the radially outward direction. With such an annular projected portion 25, when an excessive displacement occurs in the flexible part 8 in a radial direction and the outer circumferential side of the flexible part 8 comes into contact with the annular projected portion 25, the annular projected portion 25 gets deformed in a flexible manner in a radially inward direction, causing the spring constant to vary gently to reduce the vibration.

Fourth Embodiment

Figure 10:
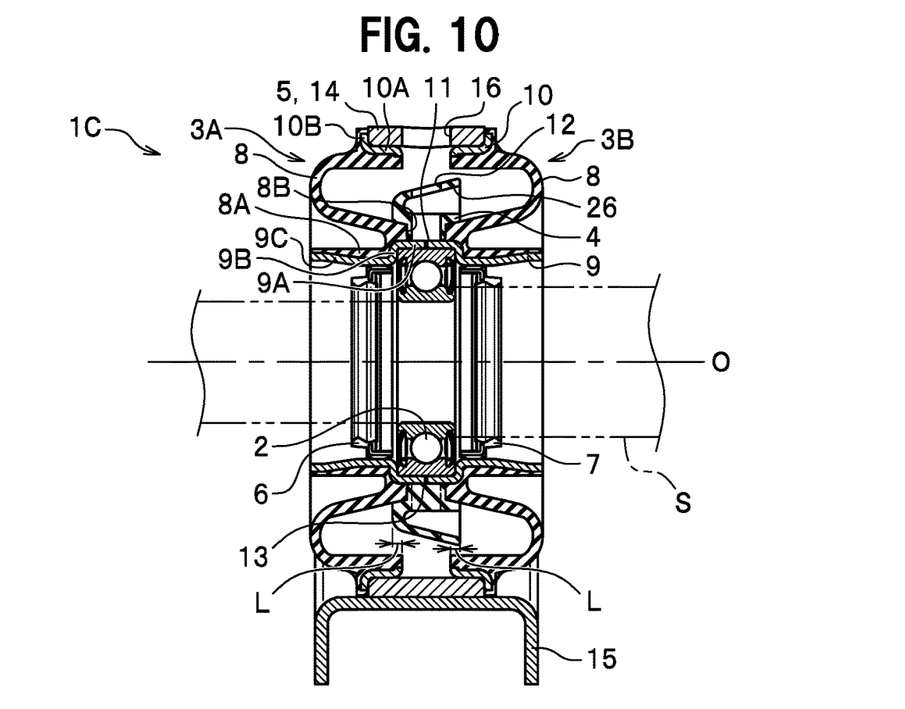
FIG. 10 is a side sectional view of a bearing assembly of a fourth embodiment.
Figure 11:
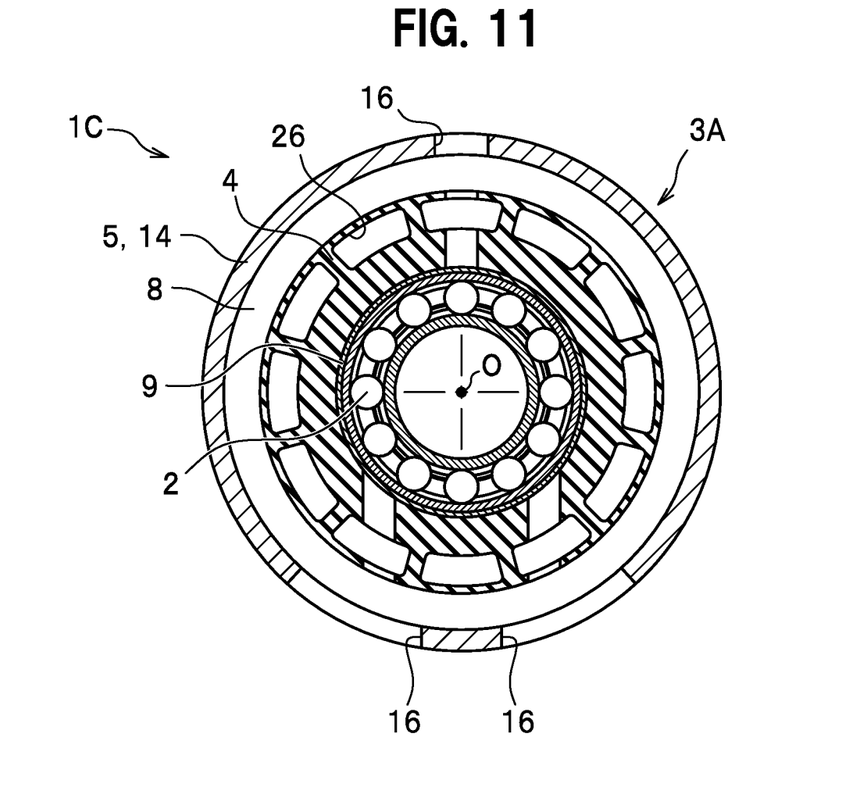
FIG. 11 is a front sectional view of the bearing assembly of the fourth embodiment.

A fourth embodiment will be described with reference to FIGS. 10 and 11. The bearing assembly 1C of the fourth embodiment differs from the bearing assembly 1 of the first embodiment in that a plurality of recesses 26 arranged in a circumferential direction are formed in an end surface of the second vibration absorbing member 4. As the other configurations are the same as those in the first embodiment, description thereof will be omitted.

As the outer circumferential surface of the second vibration absorbing member 4 is inclined, the opening area of each recess 26 is the largest at the end surface and the area of the cross section of the opening decreases with increasing distance in the depth direction of the recess 26. With such recesses 26, when an excessive displacement occurs in the flexible part 8 in a radial direction and the outer circumferential side of the flexible part 8 comes into contact with the outer circumferential surface of the second vibration absorbing member 4, the outer circumferential surface of the second vibration absorbing member 4 gets deformed in a flexible manner due to the presence of the recesses 26, causing the spring constant to vary gently to reduce the vibration.

What is claimed is:

1. A bearing assembly, comprising:
   a bearing;
   a pair of first vibration absorbing members each comprising an annular flexible part, an inner ring arranged on an inner circumferential side of the annular flexible part, and an outer ring arranged on an outer circumferential side of the annular flexible part, wherein the inner rings of the pair of first vibration absorbing members are fitted over the bearing in opposite axial directions;
   a second vibration absorbing member having an annular shape and sandwiched between the pair of first vibration absorbing members in an axial direction to be disposed on a radially outer side of the inner rings, the second vibration absorbing member having a plurality of inner pin holes penetrating from an outer circumference of the second vibration absorbing member to an inner circumference thereof; and
   an annular holding member fitted over the outer rings and having a plurality of outer pin holes penetrating from an outer circumference of the annular holding member to an inner circumference thereof so as to respectively align with the inner pin holes,
   wherein the pair of first vibration absorbing members each have an outer ring holding part on an inner circumferential side of the outer ring, and
   wherein the second vibration absorbing member is disposed with respect to the outer ring holding parts of the pair of first vibration absorbing members so as to overlap with an inner circumferential side of each of the outer ring holding parts of the pair of first vibration absorbing members by a length extending in the axial direction.

2. The bearing assembly according to claim 1,
   wherein the second vibration absorbing member is made of a rubber material.

3. The bearing assembly according to claim 2,
   wherein the second vibration absorbing member has an annular projected portion formed along an entire circumference of the second vibration absorbing member, the annular projected portion inclined toward a radially outward direction and having a thickness that gradually decreases in the radially outward direction.

4. The bearing assembly according to claim 3,
wherein the outer rings of the pair of first vibration absorbing members are press-fitted into the annular holding member.

5. The bearing assembly according to claim 2,
wherein the second vibration absorbing member is configured in an endless annular shape, and
wherein the second vibration absorbing member has an end surface in which a plurality of recesses are formed to be arranged in a circumferential direction of the second vibration absorbing member.

6. The bearing assembly according to claim 5,
wherein the outer rings of the pair of first vibration absorbing members are press-fitted into the annular holding member.

7. The bearing assembly according to claim 2,
wherein the outer rings of the pair of first vibration absorbing members are press-fitted into the annular holding member.

8. The bearing assembly according to claim 1,
wherein the second vibration absorbing member is made of a foam material.

9. The bearing assembly according to claim 8,
wherein the outer rings of the pair of first vibration absorbing members are press-fitted into the annular holding member.

10. The bearing assembly according to claim 1,
wherein the outer rings of the pair of first vibration absorbing members are press-fitted into the annular holding member.

11. A method for manufacturing a bearing assembly, the bearing assembly comprising:
a bearing;
a pair of first vibration absorbing members each comprising an annular flexible part, an inner ring arranged on an inner circumferential side of the annular flexible part, and an outer ring arranged on an outer circumferential side of the annular flexible part, wherein the inner rings of the pair of first vibration absorbing members are fitted over the bearing in opposite axial directions; and
an annular holding member fitted over the outer rings and having a plurality of pin holes penetrating from an outer circumference of the annular holding member to an inner circumference thereof,
the method comprising:
inserting nozzles into a space between the pair of first vibration absorbing members through the pin holes;
filling the space between the pair of first vibration absorbing members with a second vibration absorbing member through the nozzles; and
forming a plurality of inner pin holes penetrating from an outer circumference of the second vibration absorbing member to an inner circumference thereof, the inner pin holes being defined by nozzle removal holes formed by pulling out the nozzles after the space between the pair of first vibration absorbing members has been filled with the second vibration absorbing member and the second vibration absorbing member has been solidified.

12. A method for manufacturing a bearing assembly and holding a bearing of the bearing assembly to correct a balance of a propeller shaft held by the bearing, the bearing assembly comprising:
the bearing;
a pair of first vibration absorbing members each comprising an annular flexible part, an inner ring arranged on an inner circumferential side of the annular flexible part, and an outer ring arranged on an outer circumferential side of the annular flexible part, wherein the inner rings of the pair of first vibration absorbing members are fitted over the bearing in opposite axial directions; and
an annular holding member fitted over the outer rings and having a plurality of pin holes penetrating from an outer circumference of the annular holding member to an inner circumference thereof,
the method comprising:
inserting nozzles into a space between the pair of first vibration absorbing members through the plurality of pin holes;
filling the space between the pair of first vibration absorbing members with a second vibration absorbing member through the nozzles;
forming a plurality of inner pin holes penetrating from an outer circumference of the second vibration absorbing member to an inner circumference thereof, the plurality of inner pin holes being defined by nozzle removal holes formed by pulling out the nozzles after the space between the pair of first vibration absorbing members has been filled with the second vibration absorbing member and the second vibration absorbing member has been solidified;
inserting holding pins for holding the inner rings into the plurality of pin holes of the annular holding member and the plurality of inner pin holes; and
pressing tips of the holding pins against the inner rings to hold the bearing.

* * * * *